April 10, 1945.　　W. J. McGOLDRICK　　2,373,255
SUPERVISORY APPARATUS
Filed June 24, 1943
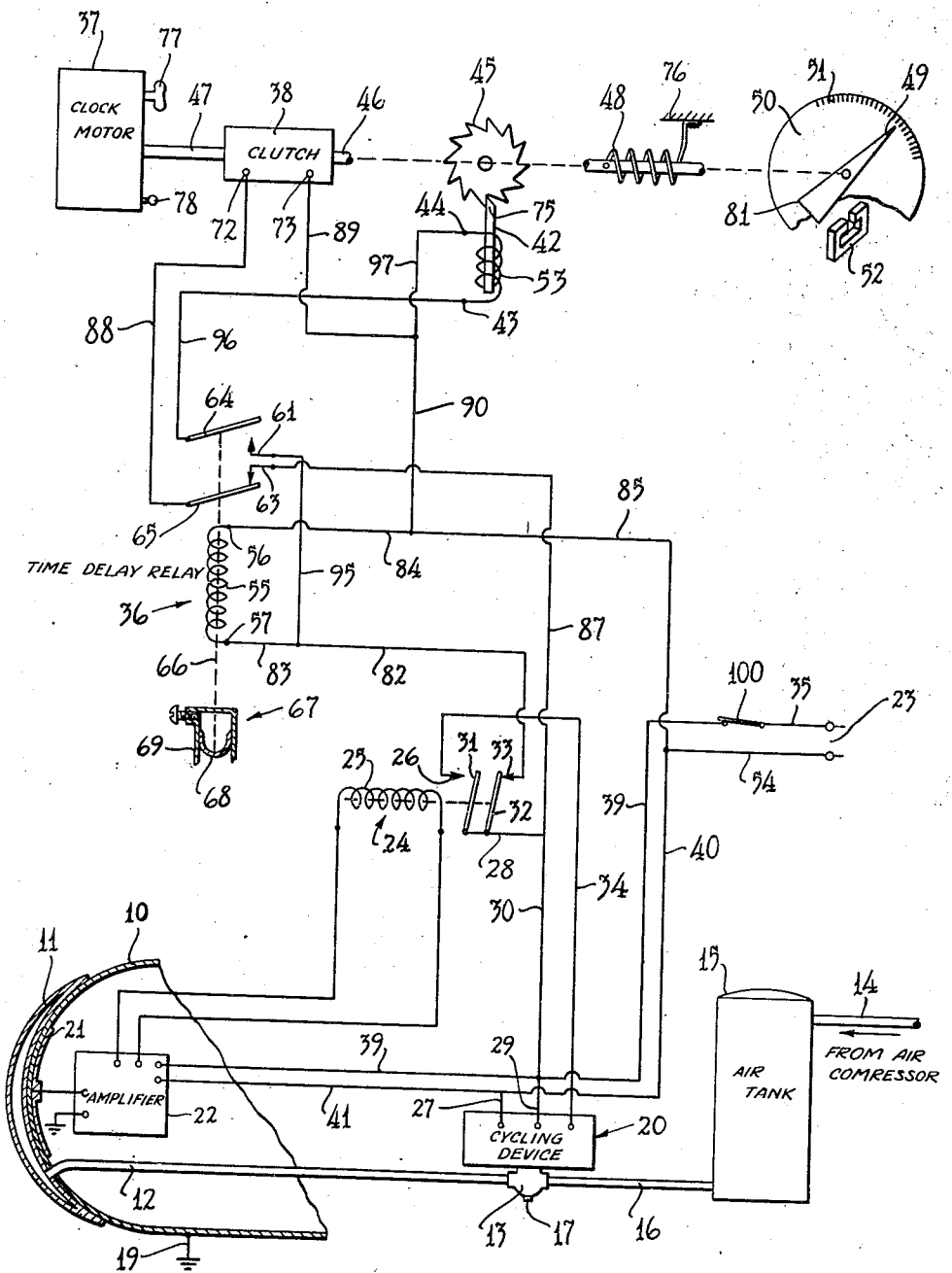
Inventor
WILLIAM J. McGOLDRICK
By
George H Fisher
Attorney Patented Apr. 10, 1945

2,373,255

UNITED STATES PATENT OFFICE 2,373,255

SUPERVISORY APPARATUS

William J. McGoldrick, Minneapolis, Minn., assignor to Minneapolis-Honeywell Regulator Company, Minneapolis, Minn., a corporation of Delaware Application June 24, 1943, Serial No. 492,118

8 Claims. (Cl. 244—134)

This invention relates to supervisory apparatus, particularly to devices for interpreting elapsed time as the significant parameter of a set of variables. My invention lends itself most readily to use as an indicator of the frequency of operating of airfoil de-icing apparatus, as a parameter of the rate of icing and of the efficacy of the de-icers.

In the operation of aircraft under unfavorable weather conditions, it is well known that one of the difficulties to be faced is that of accretion of ice particularly on the leading edges of the wing members of the craft. Numerous expedients have been suggested for overcoming this difficulty, and one common expedient is the provision of de-icer boots on the affected area. These boots are inflatable members set into the airfoil section, and after ice to a prescribed thickness is formed, the boots are inflated, thereby cracking the ice which then falls off the surface. It will be clear that such a device operates in a definite cycle of inflation and deflation of its various members, and that if too much or too little ice forms upon the boot between successive cycles of operation, its efficiency is impaired and may even be destroyed. Consequently, automatic control devices have been devised to cause the operation of such a boot to start or continue only when accretion of ice of definite magnitude has taken place.

Under certain circumstances, it may occur that an aircraft may be entering into increasingly unfavorable atmospheric conditions, where icing occurs with greater and greater rapidity, until the time approaches when the normal cycle of operation of the de-icing boot will not be rapid enough to dispose of the accretions. Thus in the progress of the craft the boot may at first operate once every ten minutes, later once every five minutes, and still later once every three minutes, the period between the initiation of successive operations of the boot becoming smaller and smaller until it approaches the period of the operating cycle of the boot. The operator of an aircraft, if he were aware of such a condition, would be able to turn his craft and proceed into less unfavorable atmospheric conditions, or, if necessary, to ground his craft. It is an object of my invention to provide an organization which will make this information known to the operator of an aircraft.

It is another object of my invention to provide an organization for indicating the extent of phenomena recurring in a cycle.

It is still another object of my invention to provide an indicating device for elapsed time in a selected portion of a recurring cycle.

Other objects and advantages of my invention will become apparent from a study of the specification and claims and of the drawing which I append hereto and which I make a part hereof, and wherein the single figure illustrates in a diagrammatic and partially fragmentary fashion what I consider to be a preferred embodiment of my invention, particularly applied as an indicator for de-icer boot operation.

Construction

In the drawing, the number 10 refers to a section of an airfoil such as the wing of an aircraft. Upon the leading surface of this airfoil is mounted an inflatable de-icer boot 11 shown schematically, and provided with compressed air through a suitable pipe 12. The flow of compressed air into and out of the de-icer 11 is regulated by valve 13, air being supplied from an air compressor, not shown, through pipe 14, storage tank 15, and pipe 16. For simplification I have shown valve 13 as being of that type where in one position air is allowed to pass from pipe 16 through the valve pipe 12 and into the de-icer boot 11, while in a second position admission of air from pipe 16 is precluded, and the air under pressure in the de-icer boot 11 is allowed to escape through an exhaust port 17. Operation of valve 13 is under the control of a cycling device referred to generally by numeral 20. It will be appreciated that this presentation of the subject matter is somewhat simplified, since in actual use the de-icer might be made up of a plurality of expansible members inflated and deflated successively in a predetermined order to complete the cycle of operation of the de-icer boot.

Also mounted on the airfoil secton for cooperation with the de-icer boot is an ice sensing member 21 adapted to be associated with an amplifier 22 for the purpose of perceiving and causing electrical response to the accretion of ice on the airfoil member. Member 21 and amplifier 22 may be of any suitable type, but I prefer to use a member and amplifier of the type disclosed in the co-pending application of Waldo H. Kliever, Serial No. 463,259, filed in the Patent Office October 24, 1942, and assigned to the assignee of the present application. The function of this device is such that an accretion of ice upon the outer surface of de-icer boot 11 creates a change in the electrical capacity between member 21 and the airfoil member 10 which is grounded as is indicated at 19, causes an unbalance in the electrical circuit of the amplifier which is provided with power from a suitable source 23 by conductors 39, 35, 41, 40 and 54.

Amplifier 22 controls the energization of a relay 24 which comprises a relay coil 25 and a pair of contact blades 31 and 32 which are adapted to engage fixed contacts 26 and 33, respectively. Contact blade 31 is normally out of engagement with contact 26 while contact blade 32 is normally in engagement with contact 33. Upon energization of relay coil 25, contact blade 31 is moved into engagement with contact 26 and contact blade 32 is moved out of engagement with contact 33.

The presence of an accretion of ice on de-icer boot 11 of sufficient magnitude to warrant the operation of the boot causes unbalance of the amplifier circuit to an extent that operating current flows through the coil of relay 24 of sufficient magnitude to the relay. Operation of the relay causes engagement of contact blade 31 with contact 26, thus establishing the following circuit to the cycling device; from the source 23 through conductor 35, a manual switch 100, conductors 39, 30, and 28, contact blade 31, contact 26, conductor 34, the cycling device 20, and conductors 27, 40, and 54 back to the source 23. As soon as the cycling device starts its operation, a maintaining relay (not shown) is closed so as to connect conductor 29 with the operating mechanism of the cycling device to establish the following maintaining circuit; from source 23 through conductor 35, switch 100, conductors 39 and 29, device 20, the maintaining relay and conductors 27, 40 and 54 back to the source. By reason of this maintaining circuit, the cycling device will continue in operation until the completion of any cycle which has once been initiated. Operation of the cycling device admits air into the de-icing boot 11, expanding the same and causing the brittle, relatively inelastic ice layer to be shattered from the outer surface of the boot. The ice being removed from de-icer boot 11 by the combined action of gravity and the air flow over the airfoil, the amplifier circuit approaches balance, current through the coil of relay 24 decreases, the armature of the relay returns to its normal position. The circuit supplying current to the cycling device through conductors 30 and 34 is broken, and on completion of its cycle, the operation of the cycling device is terminated.

The indicating portion of my apparatus will now be described. The elements comprising this portion of the apparatus consist of a time delay relay 36, a time correlated motor 37, and electromagnetically operated clutch 38, a solenoid 53 having a core 42 and a pair of terminals 43 and 44, a ratchet wheel 45, a shaft 46, a second shaft 47, a spring 48, and an indicator 49 adapted to move over a dial 50 bearing graduations 51, and to cooperate with a damping means 52 in an arbitrarily selected zero position.

Time delay relay 36 comprises a coil 55 having terminals 56 and 57, a contact assembly having fixed contacts 61 and 63 and contact blades 64 and 65, and an armature 66. The contact blade 64 is normally in engagement with contact 61 and contact blade 65 is normally out of engagement with contact 63. Upon energization of coil 55, armature 66 is effective to move contact blade 64 out of engagement with contact 61 and contact blade 65 into engagement with contact 63. The relay is further provided on its armature 66 with a one way dash-pot generally indicated by reference numeral 67 and comprising a cylinder 69 and a plunger 68. The dash-pot has an appreciable retarding effect only on the upward movement of armature 66.

Clutch 38 is provided with terminals 72 and 73 and is arranged to cause engagement, on energization, between shafts 46 and 47. The end of solenoid core 42 is shaped as a pawl 75 to cooperate with ratchet wheel 45 to hold the ratchet wheel against rotation in a counter-clockwise direction while permitting rotation of the ratchet wheel in a clockwise direction. In its normal position, that is, when no current is flowing in the coil of the solenoid, pawl 75 is engaged with worm wheel 45.

One end of spring 48 is securely attached to shaft 46, and the other end is attached to a relatively immovable member 76. Thus, spring 48 causes shaft 46 to tend to take a predetermined position, while allowing it to rotate from this position in either direction. Motor 37 may be any source of continuously rotating mechanical energy, such, for example, as a constant speed electric motor, but I have illustrated it as a clock motor provided with a key 77 by which it may be wound. A lever 78 may be provided for starting and stopping this motor. When the motor is running, shaft 47 is in continuous clockwise rotation, and shaft 46 may or may not be rotating, depending on the position of clutch 38. When rotation of shaft 46 does occur, it is in a clockwise direction so as to cause ratchet wheel 45 to rotate past pawl 75 of armature 42 and to cause the end 81 of indicator 49 to move out of engagement with the damping means 52, which may conveniently comprise a permanent magnet.

*Operation*

The apparatus is shown in the condition which it assumes when no de-icing operation is taking place. It is to be assumed that the lever 78 of the clock motor has been moved to a position in which the clock motor is in operation and that the manual switch 100 has been closed. Under these circumstances, the current supplied to relay 24 by the amplifier is insufficient to move the relay armature to its energized position. As a result, the circuit previously traced to the cycling device is open, and a circuit exists to the time delay relay 36 as follows: from the source 23 through conductor 35, manual switch 100, conductors 39, 30, and 28, contact blade 32, contact 33, conductors 82 and 83, relay coil 55, and conductors 84, 85, and 54 back to the source of power. Because of the energization of relay coil 25 by reason of the circuit just traced, contact blade 65 is maintained in engagement with contact 63 and contact blade 64 out of engagement with contact 61. By reason of the engagement of contact blade 65 with contact 63, the following circuit is established to the electromagnetic clutch 38: from the source of power 23 through conductor 35, switch 100, conductors 39, 30 and 87, contact 63, contact blade 65, conductor 88, electromagnetic clutch 38, and conductors 89, 90, 85, and 54, back to the source of power. As a result of the energization of clutch 38, shaft 46 is connected to shaft 47. Accordingly, shaft 46 is rotated in a clockwise direction by shaft 46 and is, in turn, effective to rotate the indicator 49 in a clockwise direction. With the elements in the position shown in the drawing, such rotation has occurred for an appreciable period of time with the result that the indicator 49 has moved a substantial distance from a zero position corresponding to the left hand end of the graduations 51.

Let it now be assumed that there is formed on the wing surface 10 an ice layer of sufficient magnitude to cause relay 24 to be fully energized so as to move contact blade 32 out of engagement with contact 33 and contact blade 31 into engagement with contact 26. When this happens, the circuit to the electromagnetic clutch 38 is interrupted with the result that shaft 46 is declutched from shaft 47. Thereafter, continued movement of shaft 47 has no effect upon the position of indicator 49. The indicator 49 remains in the position assumed at the time relay 24 was energized because of the fact that the pawl 75 prevents counter-clockwise movement of the shaft 46 to which the indicator 49 is attached. The movement of switch blade 31 into engagement with contact 26 establishes a circuit to the cycling device 20, as previously described. As also previously described, the cycling device is effective to first open valve 13 and then close it so as to cause a complete cycle of the boot 11 to take place.

Under normal circumstances such an operation of the boot 11 will be effective to remove the ice from the wing 10. As a result, the relay 24 will be deenergized to cause the contact arms 31 and 32 to again assume the positions shown in the drawing. During the time that relay 36 was deenergized, contact blade 64 was in engagement with contact 61. In spite of the fact that the reengagement of contact blade 32 of relay 24 with contact 33 will reestablish the energizing circuit to coil 55 of the time delay relay, switch blade 64 will remain in engagement with contact 61 for an appreciable period of time due to the action of dashpot 67. During the period in which contact blade 64 is engaged with contact 61 while contact blade 32 is engaged with contact 33, the following circuit is established to the solenoid 41: from the source of power 23 through conductor 35, switch 100, conductors 39 and 30, contact blade 32, contact 33, conductors 82 and 85, contact 61, contact blade 64, conductor 96, solenoid 41, and conductors 97, 90, 85 and 54 back to the source 23. The energization of solenoid 41, as previously described, causes pawl 75 to move downwardly to release the ratchet wheel 45 and permit spring 48 to return the indicator 81 in a counterclockwise direction to its zero position at which it is stopped by the damping means 52. This return movement of the indicator occurs very quickly before switch blade 64 moves away from contact 61 and before switch blade 65 reengages with contact 63. After a predetermined period of time dependent upon the setting of the dashpot 67, switch blade 64 separates from contact 61 to deenergize the solenoid 41 and switch blade 65 engages contact 63 to reestablish the circuit to the electromagnetic clutch previously traced. The apparatus is now in the position shown in which the clock motor 37 is operative to slowly rotate shaft 46 and indicator 49 in a clockwise direction. Such rotation will again continue as long as there is no demand for operation of the de-icer boot. The position of the indicator 49 during any period of operation of the de-icer boot thus indicates the time elapsing between the previous operation and the then existing one.

It will be seen that the adjustment of delay in relay 36 must be such that pawl 75 is disengaged from ratchet wheel 45 for a length of time sufficient to allow indicator 49 to return to its zero position under the combined influence of spring 48 and damping means 52. This means that for a perceptible period the de-icer will be out of operation without measuring engagement between the clock-motor and the indicator. However, since this interval is constant, the "zero" position of indicator 49 can be suitably calibrated so that the final indication for interval between operations of the de-icing boot will be correct.

It will be apparent to those skilled in the art that some conventional limit switching arrangement may be provided for actuation by indicator 49 at the limit of its motion, if it is desired to leave the structure of my invention unenergized during non-icing conditions. This feature, however, comprises no part of my inventive contribution, and accordingly has not been added to the drawing to avoid unnecessary complication thereof.

As I have pointed out before, other means will doubtless occur to those skilled in the art for practicing my invention. For example, suitable operating solenoids may be arranged for controlling an ordinary stop watch whereby to accomplish the purpose of my invention. It will also be apparent, as I have pointed out above, that my invention is adapted to be used for responding to sequentially recurring time intervals in any other de-icing device which provides means for operating a contactor such as that indicated by my reference numeral 30.

Accordingly, it will be realized that I have presented my drawing for purposes of illustration only, and that my invention is not to be limited thereby, but only by the scope of my appended claims.

I claim as my invention:

1. In combination with an airfoil subject to ice accretion, ice removing means carried by said airfoil and adapted to remove said accretion, ice sensing means adapted to place said last named means in operation upon accretion of a layer of ice of predetermined characteristics on said airfoil, and means including time-correlated means for successively indicating the time elapsing between successive periods of operation of said ice removing means.

2. In combination with an airfoil subject to ice accretion, ice removing means carried by said airfoil and adapted to remove said accretion, ice sensing means adapted to place said last named means in operation upon accretion of a layer of ice of predetermined characteristics on said airfoil, time indicating means, and means for initiating actuation of said time indicating means whenever operation of said ice removing means is interrupted and for interrupting actuation of said time indicating means when operation of said ice removing means is initiated.

3. In combination with an airfoil subject to ice accretion, ice removing means carried by said airfoil and adapted to remove said accretion, ice sensing means adapted to place said last named means in operation upon accretion of a layer of ice of predetermined characteristics on said airfoil, time indicating means, means for initiating actuation of said time indicating means whenever operation of said ice removing means is interrupted and for interrupting actuation of said time indicating means when operation of said ice removing means is initiated, and means for maintaining an indication of said indicating means during operation of said ice removing means.

4. In combination with an airfoil subject to ice accretion, means carried by said airfoil and adapted to remove said accretion, further means cyclically causing actuation of said first mentioned means, and means initiating said actuation in response to the presence of said accretion: an elapsed time indicator having a zero position, clock motor means associated with said indicator, means causing engagement between said clock motor means and said indicator during a first portion of said cycle, said means causing disengagement between said clock motor means and said indicator during a second portion of said cycle, means causing said indicator to return to said zero position at the beginning of said first portion of said cycle, and means maintaining said indicator in an operated position during said second portion of said cycle.

5. In combination with an airfoil subject to ice accretion, means carried by said airfoil and adapted to remove said accretion, further means cyclically causing actuation of said first mentioned means, and means initiating said actuation in response to the presence of said accretion: an indicator having a zero position, operating means associated with said indicator, means causing engagement between said operating means and said indicator during a first portion of said cycle, said means causing disengagement between said operating means and said indicator during a second portion of said cycle, means causing said indicator to return to said zero position at the beginning of said first portion of said cycle, and means maintaining said indicator in an operative position during the second said portion of said cycle.

6. In combination with an airfoil subject to ice accretion, means carried by said airfoil and adapted to remove said accretion, further means cyclically causing actuation of said first mentioned means, means initiating said actuation in response to the presence of said accretion: an indicator of elapsed time having a zero position, time correlated driving means associated with said indicator for causing operation thereof, means causing engagement between said driving means and said indicator during a first portion of said cycle, means causing disengagement between said operating means and said indicator during a second portion of said cycle, means causing said indicator to return to said zero position at the beginning of said first portion of said cycle, and means maintaining said indicator in an operative position during said second portion of said cycle.

7. In combination with an airfoil subject to ice accretion, means carried by said airfoil and adapted to remove said accretion, further means causing actuation of said first mentioned means, and means initiating said actuation in response to the presence of said accretion: an elapsed time indicator having a zero position, clock motor means associated with said indicator, a clutch selectively causing engagement or disengagement between said indicator and said clock motor, means selectively operating said clutch, means causing the indicator to return to said zero position, and means maintaining said indicator in an operated position.

8. In combination, for an airfoil subject to ice accretion; means carried by said airfoil and adapted to remove said accretion, means cyclically causing actuation of said first mentioned means, further means carried by said airfoil, said further means initiating said actuation in response to the presence of said accretion, and means successively indicating the time elapsing between successive actuation of said first mentioned means.

WILLIAM J. McGOLDRICK.